(12) United States Patent
Tu et al.

(10) Patent No.: US 6,570,717 B1
(45) Date of Patent: May 27, 2003

(54) ADJUSTABLE LENS ASSEMBLY

(75) Inventors: Yin-Fa Tu, Taoyuan Hsien (TW); Huang-Cheng Chiang, Taoyuan Hsien (TW); Chih-Wen Chen, Hsinchu Hsien (TW); Gan-Chieh Chang, Hsinchu Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/140,871

(22) Filed: May 9, 2002

(30) Foreign Application Priority Data

Nov. 16, 2001 (TW) .......................... 90128407 A

(51) Int. Cl.[7] .......................... G02B 15/14; G02B 7/02
(52) U.S. Cl. .......................... 359/696; 359/823
(58) Field of Search .......................... 359/694, 696, 359/697, 822, 823

(56) References Cited

U.S. PATENT DOCUMENTS

| 5,016,993 | A | * | 5/1991 | Akitake | 359/696 |
|---|---|---|---|---|---|
| 5,029,992 | A | * | 7/1991 | Richardson | 359/696 |
| 5,150,260 | A | | 9/1992 | Chigira | 359/694 |
| 5,377,048 | A | * | 12/1994 | Tada et al. | 359/823 |
| 5,391,866 | A | * | 2/1995 | Hoshino et al. | 250/201.2 |
| 5,815,325 | A | | 9/1998 | Johnson | 359/696 |
| 6,453,123 | B1 | * | 9/2002 | Oshima | 396/79 |

* cited by examiner

*Primary Examiner*—Ricky Mack
(74) *Attorney, Agent, or Firm*—Birch, Stewart, Kolasch & Birch, LLP

(57) ABSTRACT

An adjustable lens assembly includes a lens barrel for carrying a lens, at least one guiding member having a shaft axis parallel to the optical axis of the lens barrel for guiding the direction of motion of the lens barrel, a gear shaft driven by a driving source, a driving member meshing with the gear shaft, and a connection mechanism connecting the lens barrel and the driving member. The connection mechanism is capable of adjusting itself with multiple degrees of freedom so that if there is three-dimensional skew bias between the gear shaft and the optical axis or the guiding member, the lens barrel can be driven smoothly.

10 Claims, 6 Drawing Sheets

ADJUSTABLE LENS ASSEMBLY

BACKGROUND OF THE INVENTION

1. Field of the Invention

The invention generally relates to an adjustable lens assembly applicable to a lens of a camera, camcorder, surveillance system or the like, and more particularly relates to an adjustable lens assembly in which a lead screw mechanism is used to move the lens for the purpose of focusing or zooming.

2. Related Art

In a lens module, in order to minimize the size, a lead screw mechanism is usually used to move the lens for focusing or zooming. When using the screw mechanism, the gear shaft and the guiding elements should be well fabricated and mounted in parallel, otherwise smooth movement cannot be obtained. Any unsuitable tolerance in manufacturing or assembly of the gear shaft or the guiding elements will cause bias in the elements. In order to solve this problem, a prior method is to lessen the bias by improving the precision of fabrication and assembly of the elements. Another method is to increase the backlash between the gear shaft and the meshed nut for absorbing the clearance or bias. Though the two prior methods can solve the problem, the first one increases the tooling cost of the elements and the time cost of assembly, while the second one increases the backlash that will cause defects of imprecision movement, vibration and noise.

In a transmission mechanism, two parallel axes C1 and C4 located in two parallel planes P1 and P2, as shown in FIG. 1, have to be kept in parallel theoretically. However, due to tolerance in manufacture and assembly, the distance between the two axes cannot be kept constant along the direction of the axes; for example the distances d1 and d2 do not remain the same between the axis C2 and the axis C1. Technically, the difference, called the "bias," includes two conditions. One is inclination between two axes, for example C1 and C2, located on a co-plane. The other is skew between two axes, for example C1 and C3, located on two non-parallel planes. Bias will cause the transmission mechanism to become clogged, run awkwardly, noisily and waste power. Since the bias, and especially the skew, occurs frequently in the fabrication and assembly of a lens assembly, it is an important issue for the industry that requires an effective solution.

Some prior arts for solving the aforesaid problem are disclosed in U.S. Pat. Nos. 5,150,260 and 5,815,325. As shown in FIG. 2, the prior art uses a rack and a screw for transmission. The rack has an opening to allow inclination of the screw in the parallel plane of the opening. However, when the axis of the screw has a skew bias with the axis of the guide, an angular moment will be generated when the screw drives the rack. The opening gives only one dimension of freedom that is not enough for preventing the lens assembly from being clogged or running awkwardly.

U.S. Pat. No. 5,150,260 provides an optical apparatus with a moving member that has a gear portion meshing with a gear shaft that is movable in the direction of the optical axis and is driven by the rotation of the gear shaft to thereby move the lens holding member in the direction of the optical axis. The moving member is supported in a direction substantially orthogonal to the axial direction of said gear shaft. U.S. Pat. No. 5,815,325 discloses a lens assembly that comprises a lens barrel assembly for supporting a lens barrel, one or more guide members for guiding the movement of the lens barrel assembly in the direction of an optical axis, a gear shaft that is rotated by a primary mover, and a drive linkage for coupling the lens barrel assembly with the gear shaft. The drive linkage has a drive nut portion meshing with the gear shaft over a threaded partial circumference section thereof and movable in the direction of the optical axis by the rotation of the gear. The aforesaid two patents try to solve the skew bias by adjustments of two degrees (a linear movement and a rotation), but the bias doesn't include the skew of the axis in two different planes.

As described above, some conventional lead screw driving mechanisms for lens assemblies provide only one direction of adjustment, as illustrated in FIG. 2. Though some other mechanisms, as disclosed in U.S. Pat. Nos. 5,150,260 and 5,815,325, further provide means for adjusting rotational bias, the rotational adjustment is still limited in a plane passing through the optical axis. In other words, they do not solve the common problem of three-dimensional bias of the driving shaft to the optical axis. Another problem is the transmission method of the rack with an opening that slips easily.

SUMMARY OF THE INVENTION

The object of the invention is therefore to provide an adjustable lens assembly having a transmission mechanism with multiple degrees of freedom that can solve the problem of skew bias of the driving shaft to the optical axis.

To achieve the aforesaid object, an adjustable lens assembly according to the invention includes a lens barrel for carrying the lens, a guiding member having a shaft axis parallel to the optical axis of the lens barrel for guiding the direction of movement of the lens barrel, a gear shaft driven by a motor, a driving member meshing with the gear shaft, and a connection mechanism connecting the lens barrel and the driving member. The connection mechanism is capable of adjusting itself with multiple degrees of freedom so that if there is three-dimensional skew bias between the gear shaft and the optical axis or the guiding member, the lens barrel can be driven smoothly.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow. However, this description is for purposes of illustration only, and thus is not limitative of the invention, wherein.

DETAILED DESCRIPTION OF THE INVENTION

The invention provides an adjustable lens assembly having a transmission mechanism with multiple degrees of freedom that can solve the problem of skew bias of the driving shaft to the optical axis.

To achieve the aforesaid object, an adjustable lens assembly according to the invention includes a lens barrel for carrying a lens, a guiding member having a shaft axis parallel to the optical axis of the lens barrel for guiding the direction of movement of the lens barrel, a gear shaft driven by a driving source, a driving member meshing with the gear shaft, and a connection mechanism connecting the lens barrel and the driving member. The connection mechanism is capable of adjusting itself with multiple degrees of freedom so that if there is three-dimensional skew bias between the gear shaft and the optical axis or the guiding member, the lens barrel can be driven smoothly.

First Embodiment

Figure 1:
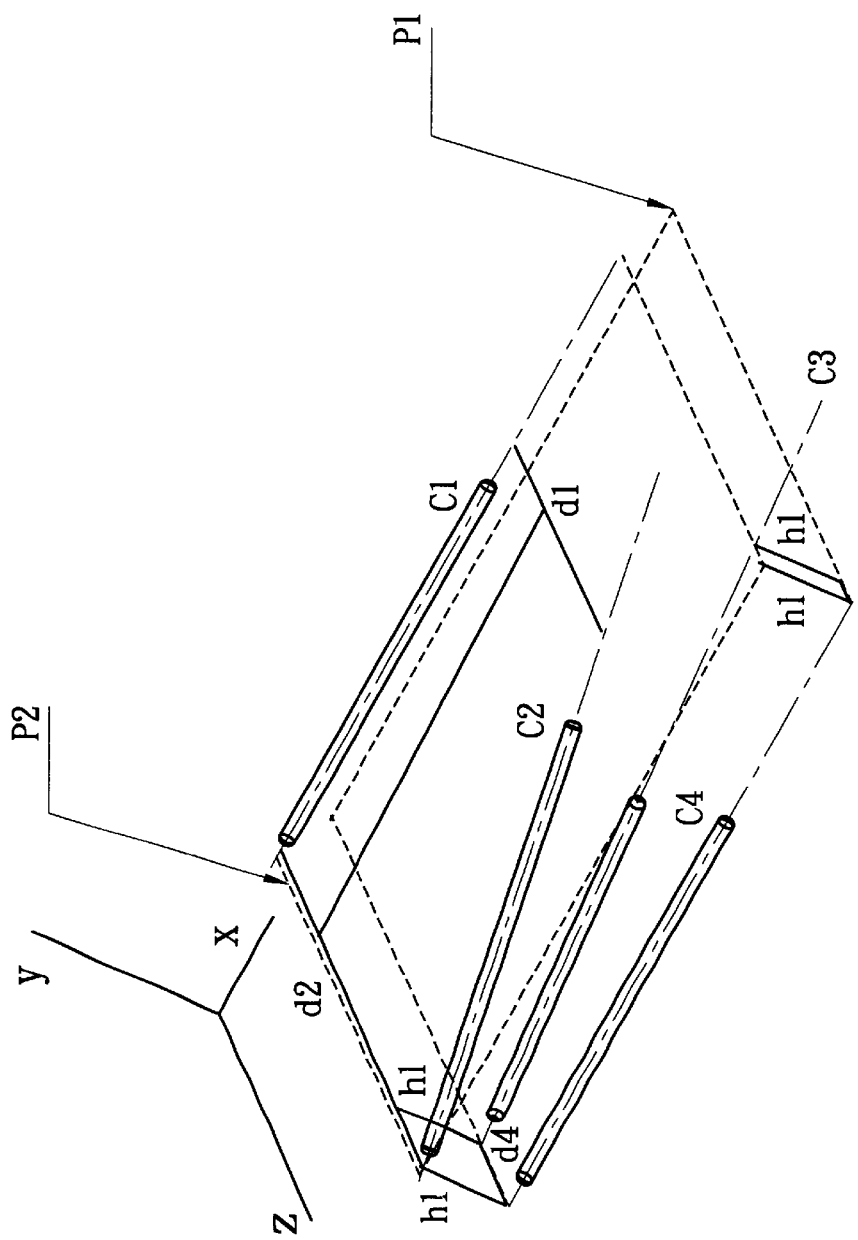
FIG. 1 is a descriptive drawing showing bias conditions of inclination and skew.
Figure 2:
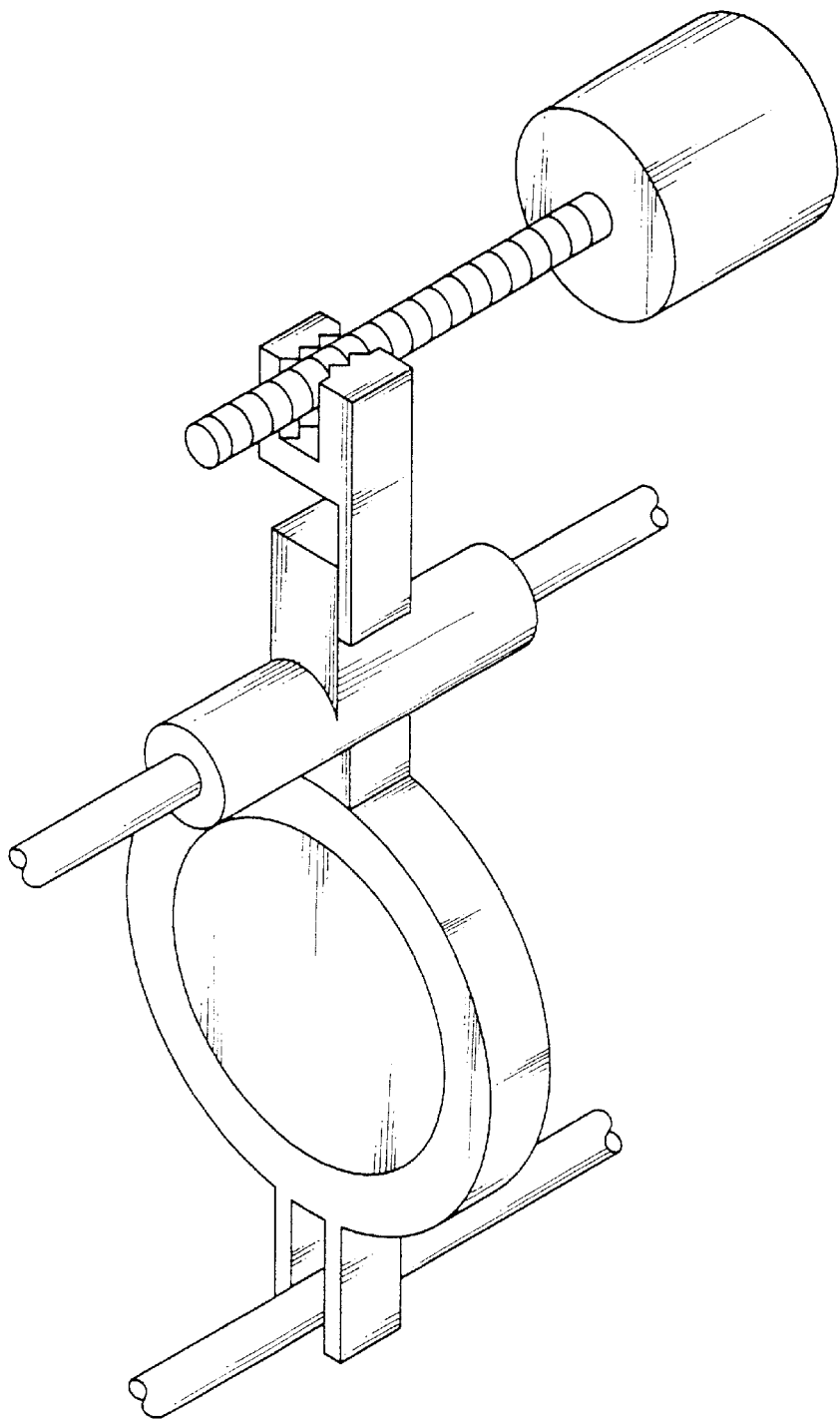
FIG. 2 is an illustration showing a conventional lens adjustment mechanism.
Figure 3:
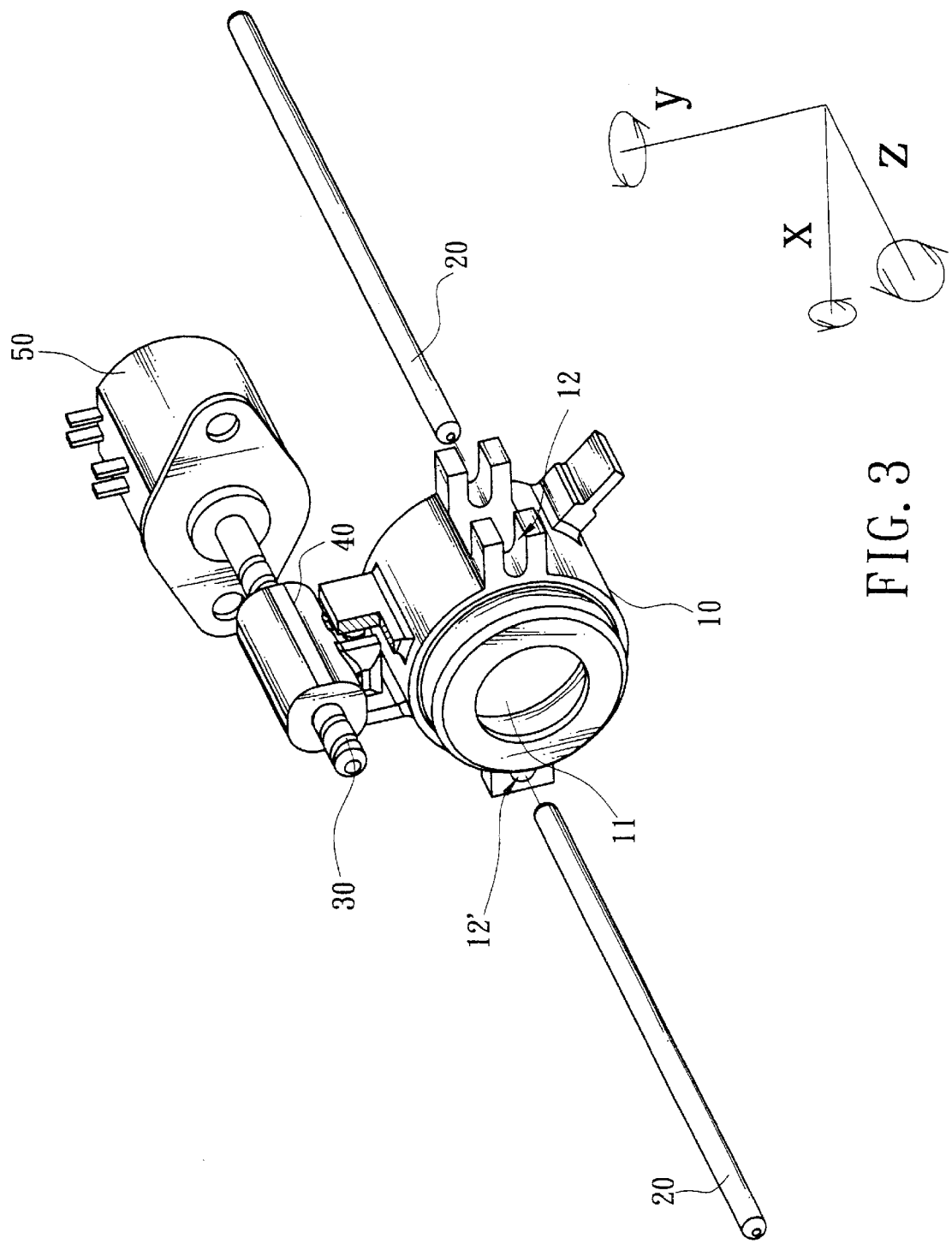
FIG. 3 is an illustrative sectional view of a first embodiment of the invention.
Figure 4:
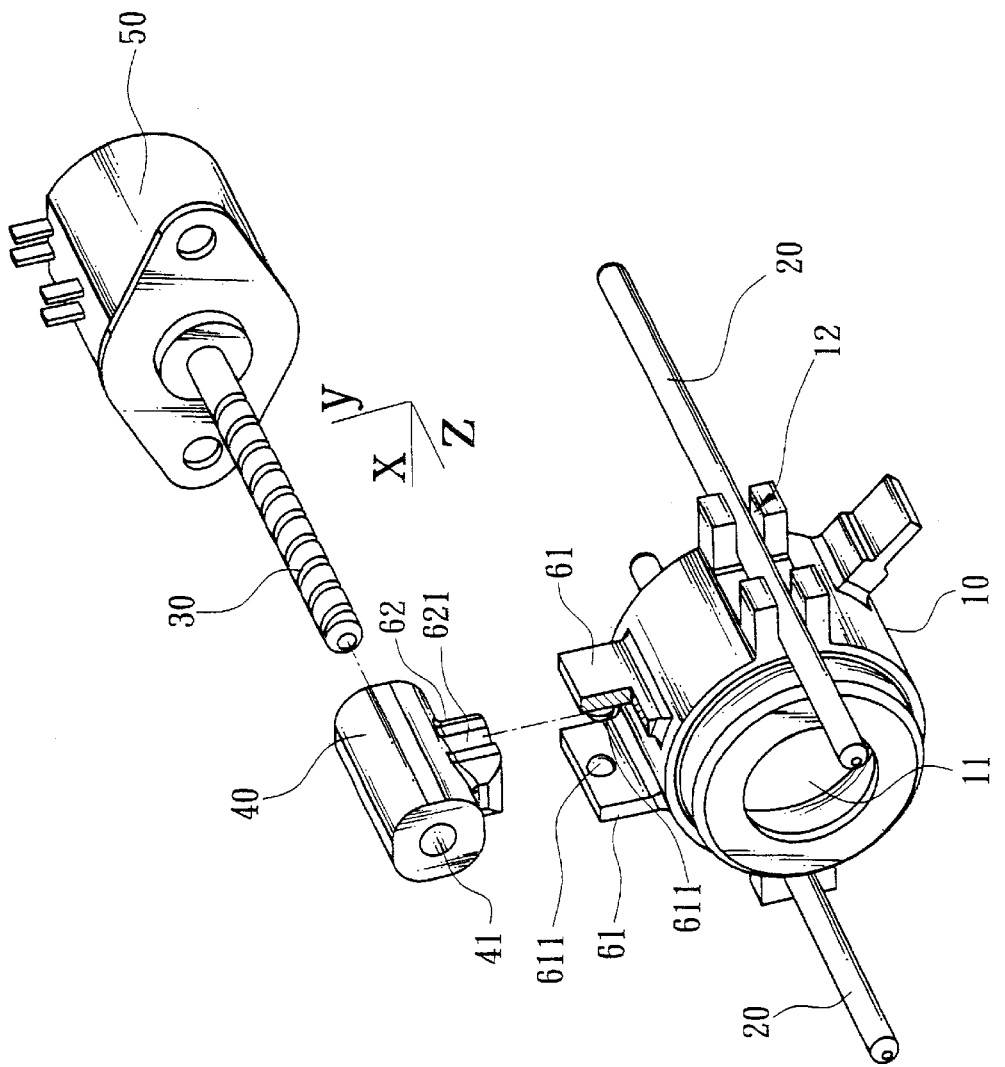
FIG. 4 is a partial exploded view of the first embodiment of the invention.

As shown in FIGS. 3 and 4, the first embodiment of the adjustable lens assembly according to the invention includes a lens barrel 10, at least one guiding member 20, a gear shaft 30 and a driving member 40. The driving member 40 meshes with the gear shaft 30 and is driven thereby so that the lens barrel 10 is movable along the optical axis. The lens barrel 10 includes a lens 11. The rim of the lens barrel 10 is formed with pairs of guiding slots 12 and guiding holes 12' for mounting on the guiding member 20 so that the lens barrel 10 is movable along the axial direction of the guiding member 20.

Each guiding member 20 is a rod laying in a direction parallel to the axis of the lens barrel 10 so as to move the lens barrel 10 in a path parallel to the optical axis. The gear shaft 30 is rotated by a motor 50. The driving member 40 is formed with a screw hole 41 for engaging with the gear shaft 30, and a connection mechanism, which will be described later, for connecting with the lens barrel 10 in a self-adjustable manner.

By the aforesaid composition, the gear shaft 30 driven by the motor 50 rotates to engage and move the driving member 40 along the axial direction of the gear shaft 30. Through the connection of the connection mechanism, the driving member 40 further moves the lens barrel 10 along the axial direction of the guiding member 20. The connection mechanism makes the driving member 40 adjustable relative to the lens barrel 10 with multiple degrees of freedom so that the lens barrel 10 can be smoothly driven along the optical axis whenever there is skew bias generated between the axis of the gear shaft 30 and the lens barrel 10.

In this embodiment, the connection mechanism between the driving member 40 and the lens barrel 10 includes a pair of extrusions 61 formed on the rim of the lens barrel 10, and a slide 62 formed on the driving member 40. The two extrusions 61 keep a suitable distance from two inner walls that are each formed with a convex portion 611. The convex portion 611 can be a resilient curved member or a ball member connected on the extrusion 61. The slide 62 couples with the extrusions 61 by engagement of a slot 621 formed on the slide 62 to the convex portions 611.

Please refer to the coordinate axis shown in the drawings. The two extrusions 61 are formed with an opening facing the Y-axis and two parallel walls in the Z-axis. The distance between the two extrusions 61 in the X-axis is larger than width of the slide 62 in the X-axis so that the driving member 40 can swing on the Y-axis and on the Z-axis by the clearance. The driving member 40 can also swing on the X-axis by the parallel walls on the Z-axis. By the slot 621 formed in the X-axis and the Y-axis, which engages with the convex portions 611, the driving member 40 can move along the Y-axis. Therefore, the driving member 40 can move relative to the lens barrel 10 with freedom of one linear movement and three angular movements.

When the gear shaft 30 engages and moves the driving member 40 in the axial direction relative to gear shaft 30, the driving member 40 moves the lens barrel 10 along the axial direction of the guiding members 20. When there is a skew bias, caused by tolerance of fabrication or assembly, between the axial direction of the gear shaft 30 and the axial direction of the guiding members 20, the connection mechanism between the driving member 40 and the lens barrel 10 acts like a ball joint that allows the driving member 40 to rotate along the X, Y and Z axes and shift in the Y-axis so as to absorb the bias and make the lens barrel 20 move smoothly.

Second Embodiment

Figure 5:
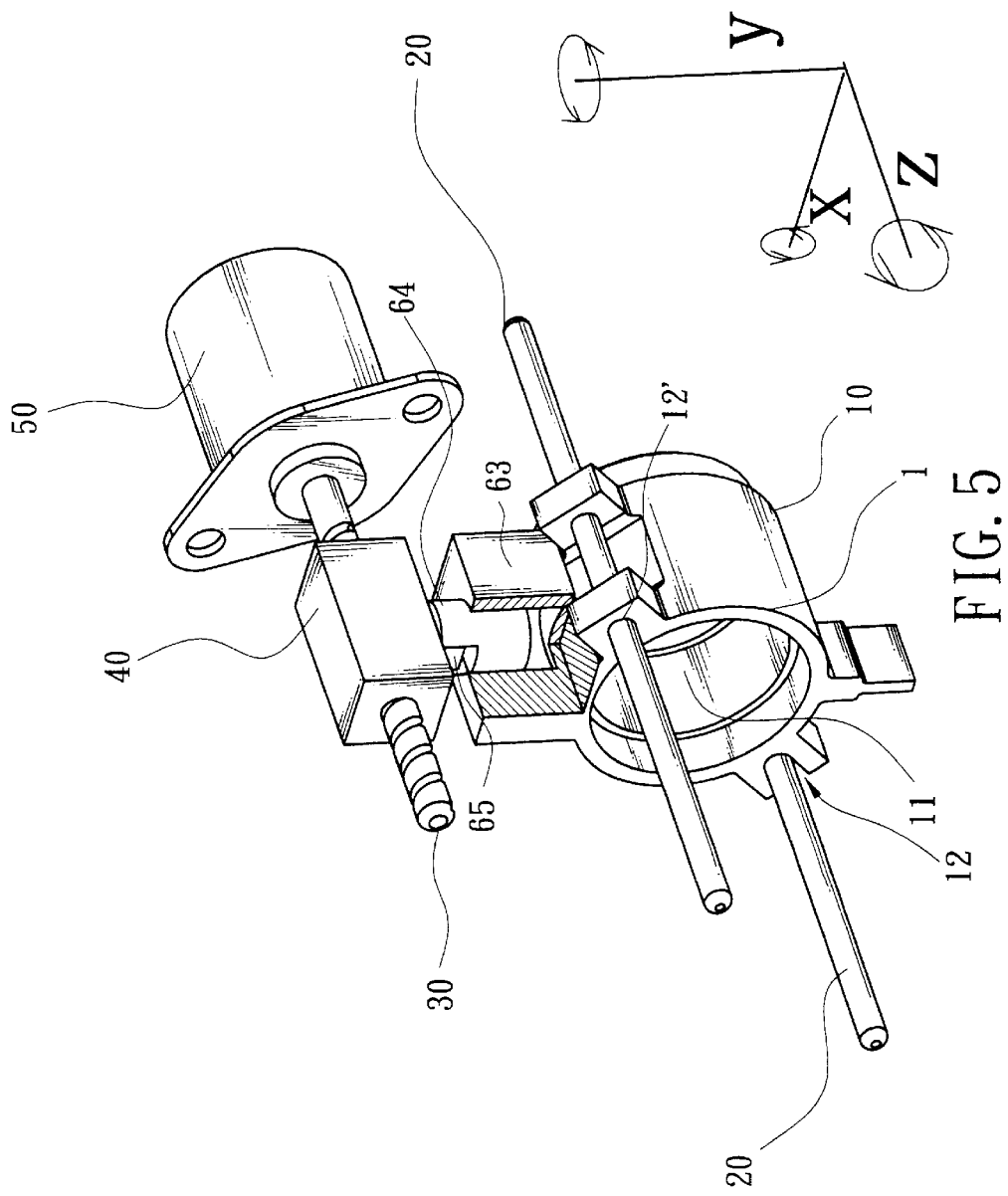
FIG. 5 is an illustrative sectional view of a second embodiment of the invention.
Figure 6:
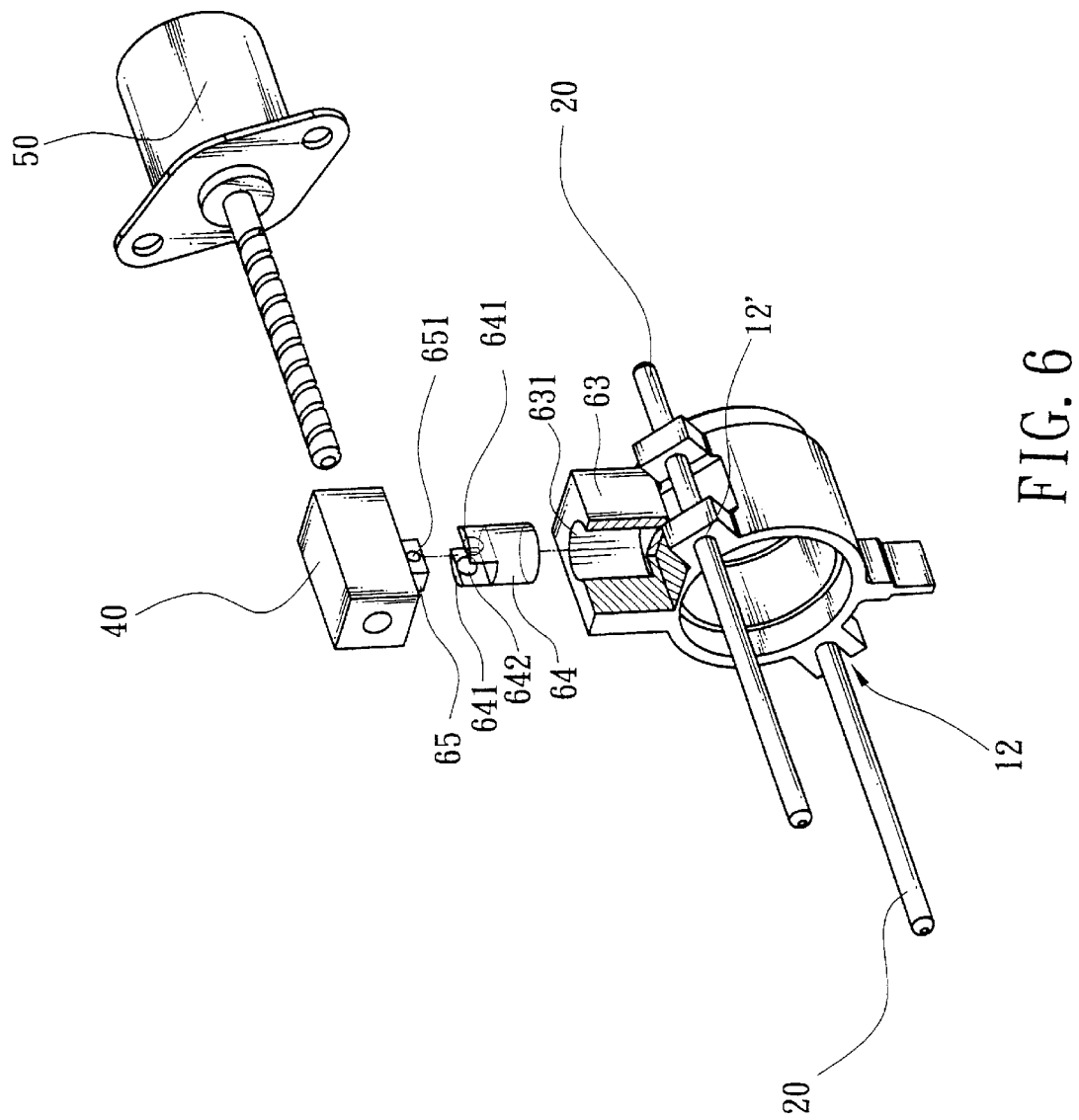
FIG. 6 is a partial exploded view of the second embodiment of the invention.

FIGS. 5 and 6 show a second embodiment of a connection mechanism applicable in an adjustable lens assembly of the invention. The connection mechanism between the driving member 40 and the lens barrel 10 includes a seat 63 formed on rim of the lens barrel 10, a slide 65 formed on the driving member 40, and a connector 64. The seat 63 is formed with a hole 631 for receiving the connector 64. A pair of extrusions 641 are formed on the connector 64. The two extrusions 641 maintain a suitable distance from two inner walls that are each formed with a convex portion 642. The slide 65 couples with the extrusions 641 by engagement of the concave portions 651 formed on the slide 65 to the convex portions 642.

Please refer to the coordinate axis shown in the drawings. By the connector 64 that can be slid in the hole 631 along the Y-axis, the height of the connector 64 and the lens barrel 10 can be adjusted and rotated along the Y-axis. The two extrusions 641 form an opening facing the Y-axis and two parallel walls in the Z-axis. The distance between the two extrusions 641 in the X-axis is larger than the width of the slide 65 in the X-axis so that the driving member 40 can swing on the Y-axis and on the Z-axis by the clearance. The driving member 40 can also swing on the X-axis is by the parallel walls of the two extrusions 641 on the Z-axis. Therefore, when the gear shaft 30 engages and moves the driving member 40 in the axial direction relative to the gear shaft 30, the driving member 40 moves the lens barrel 10 along the axial direction of the guiding members 20. When there is a skew bias between the axial direction of the gear shaft 30 and the axial direction of the guiding members 20, the connection mechanism between the driving member 40 and the lens barrel 10 acts like a ball joint that allows the driving member 40 to rotate along the X, Y and Z axes and shift in the Y-axis so as to absorb the bias and make the lens barrel 20 move smoothly.

Please note that in the aforesaid embodiments, the convex portion 611 and the slot 621, or the convex portion 642 and the concave portions 651, can swap positions with each other and still maintain their same functions.

As described above, the invention provides an adjustable lens assembly having a transmission mechanism with multiple degrees of freedom that can solve the problem of skew bias of the driving shaft to the optical axis.

Through the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An adjustable lens assembly comprising:
   a lens barrel for carrying lens;
   at least one guiding member having a shaft axis parallel to the optical axis of said lens barrel for guiding moving direction of said lens barrel;
   a gear shaft driven by a driving source;
   a driving member meshing with said gear shaft; and
   a connection mechanism connecting said lens barrel and said driving member for providing multiple degree of freedom.

2. An adjustable lens assembly according to claim 1 wherein said driving member is formed with a screw hole for meshing with said gear shaft.

3. An adjustable lens assembly according to claim 1 wherein said multiple degree of freedom including a linear movement and three angular movements.

4. An adjustable lens assembly comprising at least:
   a lens barrel, for carrying lens, formed with a pair of extrusions at the rim thereof, and at least a convex portion formed on each inner wall of said extrusion;
   at least one guiding member having a shaft axis parallel to the optical axis of said lens barrel for guiding moving direction of said lens barrel;
   a gear shaft driven by a driving source; and
   a driving member, meshing with said gear shaft, having a pair of slides engageable with said extrusions of said lens barrel, and correspondent slot for engaging said convex portion.

5. An adjustable lens assembly according to claim 4 wherein said convex portion is a curvy member.

6. An adjustable lens assembly according to claim 4 wherein said convex portion is a ball member.

7. An adjustable lens assembly according to claim 4 wherein said convex portion is a resilient member.

8. An adjustable lens assembly according to claim 4 wherein said driving member is formed with a screw hole for meshing with said gear shaft.

9. An adjustable lens assembly comprising at least:
   a lens barrel, for carrying lens, formed with a seat at the rim thereof, and a hole formed on said seat;
   a connector, slidably mounted in said hole, formed with a pair of extrusions keeping a distance therebetween, and formed with at least a convex portion on each inner wall of said extrusions;
   at least one guiding member having a shaft axis parallel to the optical axis of said lens barrel for guiding moving direction of said lens barrel;
   a gear shaft driven by a driving source; and
   a driving member, meshing with said gear shaft, having a pair of slides engageable with said extrusions of said connector, and correspondent slot for engaging said convex portion.

10. An adjustable lens assembly according to claim 9 wherein said driving member is formed with a screw hole for meshing with said gear shaft.

* * * * *